United States Patent
Sasaki

(10) Patent No.: US 11,249,701 B2
(45) Date of Patent: Feb. 15, 2022

(54) IMAGE FORMING APPARATUS THAT ISSUES NOTIFICATION OF MISMATCH BETWEEN OPERATION TYPE OF IMAGE FORMING APPARATUS AND OPERATION TYPE OF CONSUMABLE ITEM AND METHOD FOR CONTROLLING THE SAME

(71) Applicant: CANON KABUSHIKI KAISHA, Tokyo (JP)

(72) Inventor: Hidemi Sasaki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/221,099

(22) Filed: Dec. 14, 2018

(65) Prior Publication Data
US 2019/0187943 A1 Jun. 20, 2019

(30) Foreign Application Priority Data
Dec. 18, 2017 (JP) .............................. JP2017-241486

(51) Int. Cl.
*G06F 3/12* (2006.01)

(52) U.S. Cl.
CPC ............ *G06F 3/1235* (2013.01); *G06F 3/121* (2013.01); *G06F 3/1203* (2013.01); *G06F 3/1219* (2013.01); *G06F 3/1278* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2017/0359472 A1* | 12/2017 | Kaneko | ................. G06F 3/1204 |
| 2018/0183955 A1* | 6/2018 | Sasakuma | .......... H04N 1/00477 |

FOREIGN PATENT DOCUMENTS

| | | |
|---|---|---|
| JP | H05145689 A | 6/1993 |
| JP | 2002169428 A | 6/2002 |
| JP | 2007190729 A | 8/2007 |
| JP | 2008052543 A | 3/2008 |
| JP | 2008137333 A | 6/2008 |
| JP | 201128017 A | 2/2011 |
| JP | 2012045902 A | 3/2012 |
| JP | 2013161058 A | 8/2013 |

* cited by examiner

*Primary Examiner* — Lennin R Rodriguezgonzalez
(74) *Attorney, Agent, or Firm* — Canon U.S.A., Inc. IP Division

(57) ABSTRACT

An output unit determines whether a plurality of consumables installed in the output apparatus, such as a fixing unit and a transfer belt unit, are properly installed based on information on the main body of the output apparatus and information on the consumables. When the consumables are not properly installed, the output unit issues a message indicating a warning or an error to the user.

13 Claims, 11 Drawing Sheets

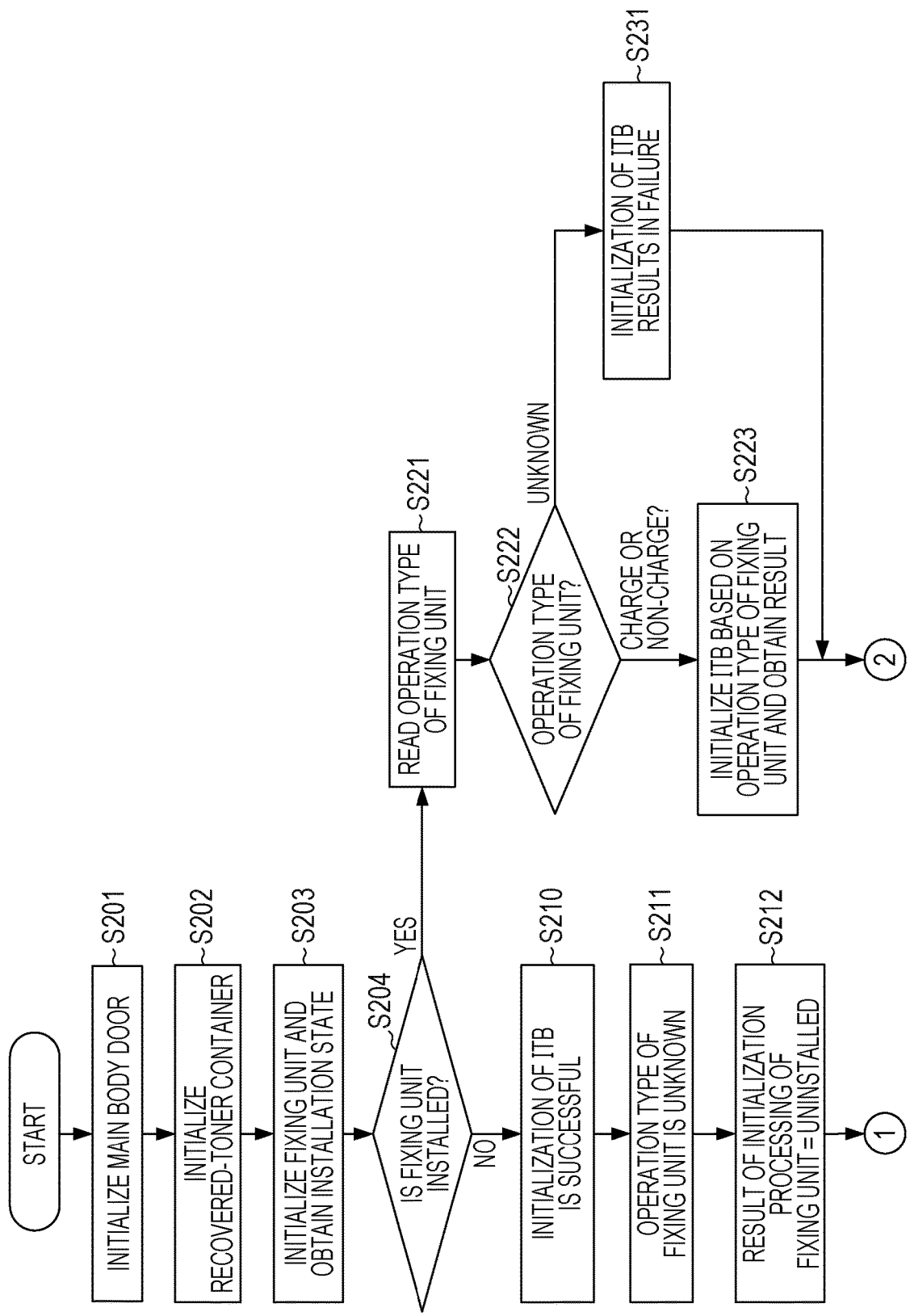

FIG. 6A

| No. | PHYSICAL STATE ||||  NOTICE FROM ENGINE FIRM TO CONTROL FIRM |||| MESSAGE LIST ||||
|---|---|---|---|---|---|---|---|---|---|---|---|
| | FIXING UNIT || ITB | | FIXING UNIT || ITB | | FIXING UNIT ||| ITB |
| | (a) CONNECTION STATE | (b) OPERATION TYPE | (c) CONNECTION STATE | (d) RESULT OF INITIALIZATION PROCESSING | (e) OPERATION TYPE | (f) RESULT OF INITIALIZATION PROCESSING | (g) UNINSTALLATION ERROR | (h) OPERATION TYPE MISMATCH ERROR | (i) MEMORY FAILURE WARNING | (j) DATA ERROR WARNING | (k) INSTALLATION DEFECT ERROR |
| 1 | NORMAL | NON-CHARGE | NON-CHARGE | SUCCESS | NON-CHARGE | SUCCESS | | | | | |
| 2 | NORMAL | NON-CHARGE | CHARGE | SUCCESS | NON-CHARGE | FAILURE | | | | | ■ |
| 3 | NORMAL | NON-CHARGE | UNINSTALLED/FAILURE | SUCCESS | NON-CHARGE | FAILURE | | | | | ■ |
| 4 | NORMAL | CHARGE | NON-CHARGE | SUCCESS | CHARGE | FAILURE | | ■ | | | ■ |
| 5 | NORMAL | CHARGE | CHARGE | SUCCESS | CHARGE | SUCCESS | | ■ | | | |
| 6 | NORMAL | NON-CHARGE | UNINSTALLED/FAILURE | SUCCESS | CHARGE | FAILURE | | ■ | | | ■ |
| 7 | MEMORY FAILURE | NON-CHARGE | NON-CHARGE | MEMORY FAILURE | NON-CHARGE | SUCCESS | | | □ | | |
| 8 | MEMORY FAILURE | NON-CHARGE | CHARGE | MEMORY FAILURE | NON-CHARGE | FAILURE | | | □ | | ■ |
| 9 | MEMORY FAILURE | NON-CHARGE | UNINSTALLED/FAILURE | MEMORY FAILURE | NON-CHARGE | FAILURE | | | □ | | ■ |

FROM FIG. 6A

| # | | | | | | |
|---|---|---|---|---|---|---|
| 10 | MEMORY FAILURE | CHARGE | NON-CHARGE | MEMORY FAILURE | CHARGE | FAILURE |
| 11 | MEMORY FAILURE | CHARGE | CHARGE | MEMORY FAILURE | CHARGE | SUCCESS |
| 12 | MEMORY FAILURE | CHARGE | UNINSTALLED/FAILURE | MEMORY FAILURE | CHARGE | FAILURE |
| 13 | MEMORY FAILURE | UNKNOWN | NON-CHARGE | MEMORY FAILURE | UNKNOWN | FAILURE |
| 14 | MEMORY FAILURE | UNKNOWN | CHARGE | MEMORY FAILURE | UNKNOWN | FAILURE |
| 15 | MEMORY FAILURE | UNKNOWN | UNINSTALLED/FAILURE | MEMORY FAILURE | UNKNOWN | FAILURE |
| 16 | DATA ERROR | NON-CHARGE | NON-CHARGE | DATA ERROR | NON-CHARGE | SUCCESS |
| 17 | DATA ERROR | NON-CHARGE | CHARGE | DATA ERROR | NON-CHARGE | FAILURE |
| 18 | DATA ERROR | NON-CHARGE | UNINSTALLED/FAILURE | DATA ERROR | NON-CHARGE | FAILURE |
| 19 | DATA ERROR | CHARGE | NON-CHARGE | DATA ERROR | CHARGE | FAILURE |
| 20 | DATA ERROR | CHARGE | CHARGE | DATA ERROR | CHARGE | SUCCESS |
| 21 | DATA ERROR | NON-CHARGE | UNINSTALLED/FAILURE | DATA ERROR | CHARGE | FAILURE |
| 22 | DATA ERROR | UNKNOWN | NON-CHARGE | DATA ERROR | UNKNOWN | FAILURE |
| 23 | DATA ERROR | UNKNOWN | CHARGE | DATA ERROR | UNKNOWN | FAILURE |
| 24 | DATA ERROR | UNKNOWN | UNINSTALLED/FAILURE | DATA ERROR | UNKNOWN | FAILURE |
| 25 | UNINSTALLED | UNKNOWN | NON-CHARGE | UNINSTALLED | UNKNOWN | SUCCESS |
| 26 | UNINSTALLED | UNKNOWN | CHARGE | UNINSTALLED | UNKNOWN | SUCCESS |
| 27 | UNINSTALLED | UNKNOWN | UNINSTALLED/FAILURE | UNINSTALLED | UNKNOWN | SUCCESS |

IMAGE FORMING APPARATUS THAT ISSUES NOTIFICATION OF MISMATCH BETWEEN OPERATION TYPE OF IMAGE FORMING APPARATUS AND OPERATION TYPE OF CONSUMABLE ITEM AND METHOD FOR CONTROLLING THE SAME

BACKGROUND

Field of the Disclosure

The present disclosure relates to output apparatuses in which consumables are installed.

Description of the Related Art

Output apparatuses that produce an output using consumables are known in the art. One example is an output apparatus that forms an image on a sheet based on print data. Output apparatuses typified by an image forming apparatus in business have a charge operation type and a non-charge operation type. In the charge operation type, consumables are provided to customers free of charge, and a usage fee corresponding to the print counter of the image forming apparatus main body is collected from the customers. In contrast, in the non-charge operation type, consumables are provided for pay, and a usage fee corresponding to the print counter of the image forming apparatus main body is not collected.

To avoid misplacement of charged consumables and non-charged consumables, the hardware to which consumables are to be attached is generally shaped differently between a charged image forming apparatus and a non-charged image forming apparatus even with the same printer engine. Like the hardware of the image forming apparatus to which the consumables are attached, the hardware of the charged consumables and the non-charged consumables are also generally shaped differently.

The misplacement refers to installing non-charged consumables in a charged image forming apparatus (an image forming apparatus set in a charging mode) and conversely, charged consumables are installed in a non-charged image forming apparatus (an image forming apparatus set in a non-charging mode). If a non-charged consumable is misplaced in a charged image forming apparatus, both the price of the consumable and a usage charge corresponding to the print counter can be collected from the customer. In contrast, if a charged consumable is misplaced in a non-charged image forming apparatus, neither the price of the consumable nor a usage charge corresponding to the print counter can be collected.

Image forming apparatuses use not only cartridges containing toner but also detachable consumables other than the cartridges, such as a fixing unit, an intermediate transfer belt (ITB), and a recovered-toner container. Such consumables as the fixing unit and the ITB unit have conventionally been replaced by service engineers who maintain the apparatuses. The operation type of consumables to be replaced by the service engineers has not been determined on the image forming apparatuses.

However, a request to reduce the down time for maintaining the image forming apparatuses and the cost associated with the dispatch of service engineers has recently become stronger. This has increased, in the market, a service form in which consumables that have been replaced by service engineers are replaced by users themselves.

Japanese Patent Laid-Open No. 2008-137333 discloses an image forming apparatus that can be switched between a charging mode and a non-charging mode by the manager changing the settings, with the consumables to be installed in the image forming apparatus kept common.

Japanese Patent Laid-Open No. 2011-28017 discloses an image forming apparatus that determines whether the consumables are genuine products based on the intensity of answer signals from radio-frequency identification (RFID) tags on the consumables that manage information on the consumables.

However, shaping the hardware of the image forming apparatus or the consumables differently according to the difference in operation type makes it impossible to share the consumables, resulting in a decrease in productivity and an increase in manufacturing cost.

In contrast, shaping the consumables or the installation portions in common and allowing the manager to change the mode of the image forming apparatus, as in the image forming apparatus disclosed in Japanese Patent Laid-Open No. 2008-137333, can cause misplacement of unintended consumables.

To distinguish misplacement, the image forming apparatus disclosed in Japanese Patent Laid-Open No. 2011-28017 includes RFID tags on the toner cartridges and determines the types of the consumables by reading the RFID tags. However, providing the RFID tags on the consumables, such as an ITB unit, has difficulties such as limiting the attaching position.

Furthermore, an increase in the kind of consumables to be replaced by the user can cause misplacement of the various consumables.

SUMMARY

The present disclosure provides a system for properly operating various kinds of consumables that can be installed in an output apparatus while reducing an increase in cost.

The present disclosure provides an output apparatus to which a plurality of different kinds of consumables can be installed. The output apparatus includes a first acquisition unit configured to acquire information indicating a type of the output apparatus, a second acquisition unit configured to acquire information indicating a plurality of consumable operation types that are operation types of the plurality of consumables, and a determination unit configured to determine whether to issue a predetermined notification based on the information acquired by the first acquisition unit and the second acquisition unit.

Further features of the present disclosure will become apparent from the following description of exemplary embodiments with reference to the attached drawings.

BRIEF DESCRIPTION OF THE DRAWINGS

FIGS. 2A and 2B illustrate a flowchart of a process for initializing consumables executed by an engine control unit according to one or more aspects of the present disclosure.

FIGS. 6A and 6B illustrate a table illustrating a message list created from the states of an intermediate transfer belt (ITB) and a fixing unit.

DESCRIPTION OF THE EMBODIMENTS

Embodiments of the present disclosure will be described hereinbelow with reference to the drawings.

Prior to the description of the present disclosure, the concept of "operation type" will be described.

Although the following embodiments are based on operation types focusing on a difference in charging method, the present disclosure can also be applied to operation types focusing on methods other than the difference in charging method. For example, the region where the products are sold may be divided, and different operation types may be defined for each region. In another example, image forming apparatuses in which the shapes of the consumables are the same, but the printing speeds differ may be differently produced, and different operation types may be defined thereto. In still another example, different operation types may be defined according to the selling time. In still another example, different operation types may be defined according to whether the image forming apparatus has a function other than printing. Thus, various possible operation types can be defined in the present disclosure according to the commercial purpose.

In the present disclosure, the operation type of the image forming apparatus main body may be referred to as a main body operation type, and the operation type of the consumables may be referred to as a consumable operation type.

First Embodiment

In a first embodiment, the operation type of a fixing unit 198 is read from a non-volatile memory (NVM) 188 provided in the fixing unit 198. An ITB 197 is initialized based on the operation type of the fixing unit 198, and the status of the ITB 197 and a message on the ITB 197 are determined by way of example. This is an example in which the fixing unit 198 is used in the determination of an engine control unit 151 in consideration of the replacement frequency and the ease of replacement of the fixing unit 198.

Figure 1:
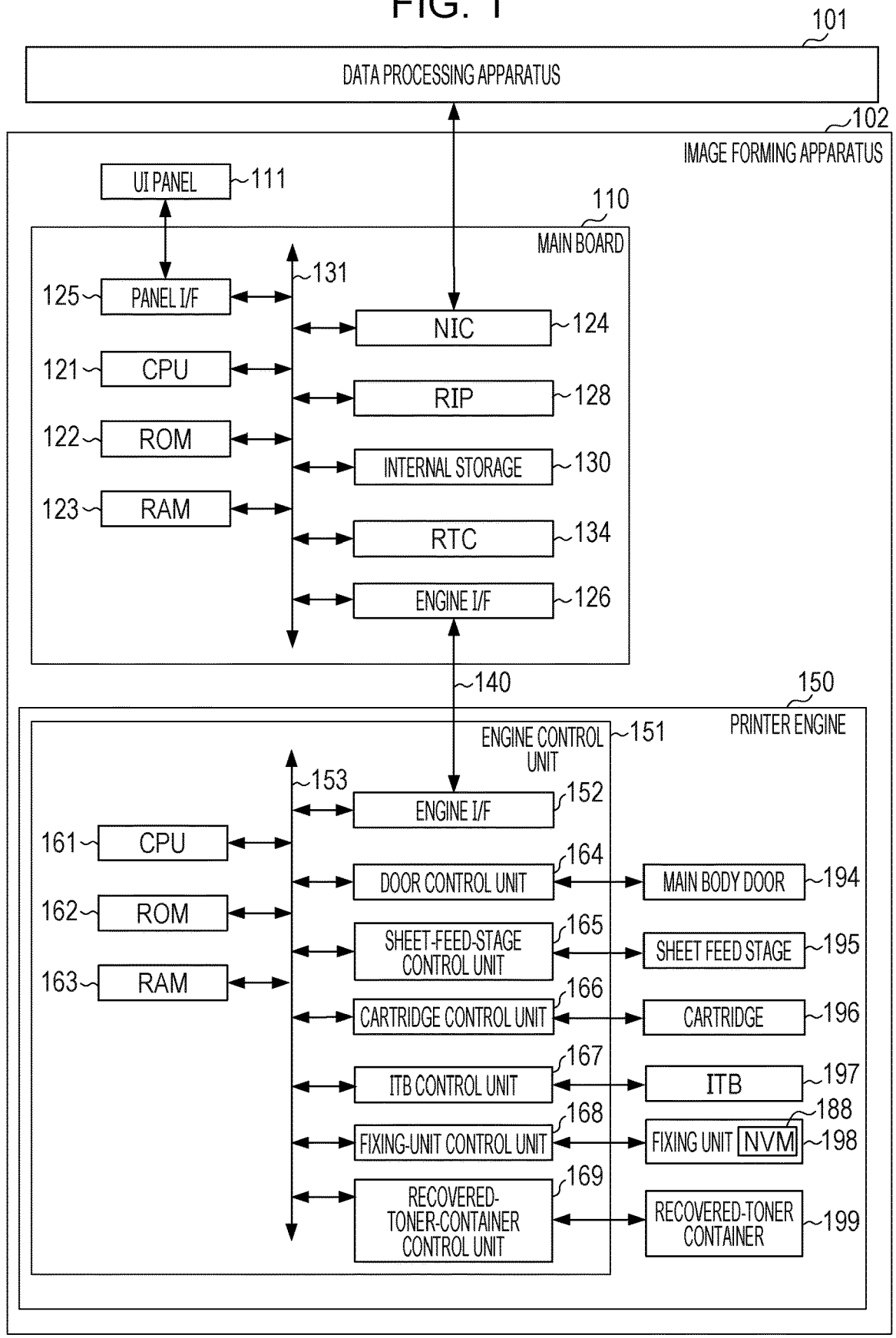
FIG. 1 is a block diagram illustrating the module configuration of an image forming apparatus.

FIG. 1 is a block diagram illustrating the module configuration of an image forming apparatus 102, which is an example of the output apparatus.

A data processing apparatus 101 (for example, a personal computer [PC]) creates page description language (PDL) data and transmits the created PDL data to the image forming apparatus 102. The PDL data contains various instructions necessary for image formation including a drawing command for data on an image to be formed on the sheet and instructions for the size, type, and basis weight of the sheet for use in image formation.

The image forming apparatus 102 (for example, a laser printer) receives the PDL data from the data processing apparatus 101 and forms an image on the sheet based on image data according to the PDL data. The image forming apparatus 102 may be a multifunctional machine having a scanner function, a facsimile function, and so on. In this case, the image forming apparatus 102 may have a function for forming images of various electronic document files based on document data read using the scanner function or received using the facsimile function. The image forming apparatus 102 may also have a function for forming an image of document data read using the scanner function on a sheet.

As illustrated, the image forming apparatus 102 includes a main board 110, a user interface (UI) panel 111, and a printer engine 150.

The printer engine 150 includes various components and an engine control unit 151 for controlling the components. The main board 110 and the engine control unit 151 are connected with a communication path 140 so as to transmit and receive information.

The UI panel 111 is a user interface and includes a display that displays various items of information to the user and an operating unit that receives user operations. For example, the UI panel 111 may have a touch panel in addition to physical buttons. The UI panel 111 may have a function for giving a warning or an error generated in the image forming apparatus 102 by lighting or blinking. The UI panel 111 may further has a function for giving a warning or an error generated in the image forming apparatus 102 using the sound of a beeper or the like.

The main board 110 is sometimes referred to as a main system of the image forming apparatus. The main board 110 creates bitmap data (image data) for printing based on the PDL data transmitted from the data processing apparatus 101. The main board 110 transmits the bitmap data to the engine control unit 151. The main board 110 itself may create PDL data and give a print instruction to print the settings and the state of the image forming apparatus 101 as a report.

The engine control unit 151 may be referred to as a subsystem in the image forming apparatus. The engine control unit 151 controls the components of the printer engine 150 to form an image on a sheet with toner using an electrophotographic system based on the bitmap data received from the main board 110. In image formation, for example, an ink jet system that uses ink as a recording material may be used instead of the electrophotographic system that uses toner as a recording material. The printer engine 150 may include recording materials of a plurality of colors for color printing. The printer engine 150 may include a plurality of sheet feed stages and may feed a sheet from a sheet feed stage indicated by the PDL data.

As illustrated, the main board 110 includes a central processing unit (CPU) 121, a read-only memory (ROM) 122, a random-access memory (RAM) 123, a network interface controller (NIC) 124, and a panel interface (I/F) 125. The main board 110 further includes an engine I/F 126, a raster image processor (RIP) 128, an internal storage 130, and a real-time clock (RTC) 134. These components are connected to one another via a bus 131.

The CPU 121 expands controller firmware (programs installed in the firmware of the main board 110) stored in the ROM 122 or the internal storage 130 to the RAM 123. The CPU 121 controls the image forming apparatus 102 by executing the controller firmware.

The controller firmware includes a PDL interpreter function. The PDL interpreter function is a function for interpreting PDL data and converting the PDL data to intermediate data that the RIP 128 can interpret.

The ROM 122 is a non-volatile memory that stores the controller firmware that the CPU 121 executes and so on. The controller firmware may be started in a multi-step configuration in which an initial program having only a minimal basic function, such as a file system access function, is started, and then the initial program executes the controller firmware. The information on the operation type of the main body of the image forming apparatus 102 in the present disclosure may be stored in the ROM 122. In some embodiments, a dedicated ROM for storing the operation type information is separately installed.

The RAM 123 stores the controller firmware expanded from the ROM 122 or the internal storage 130. The RAM 123 stores the PDL data, intermediate data created by interpreting the PDL data, and bitmap data created by rendering the intermediate data. The RAM 123 also stores various temporary process statuses necessary for other processing and log information.

The NIC 124 is a network interface controller that connects the data processing apparatus 101 and the main board 110 to each other to relay data communication therebetween, that is, transmission and reception of data. For connection, a wired connection or a wireless connection is used. In the wired connection, the NIC 124 and the data processing apparatus 101 are connected using Ethernet®.

The panel I/F 125 connects the UI panel 111 and the main board 110 to each other to relay data communication therebetween, that is, transmission and reception of data. The engine I/F 126 connects the engine control unit 151 and the main board 110 to each other to relay data communication therebetween, that is, transmission and reception of data, via the communication path 140.

The RIP 128 converts intermediate data to bitmap data and expands the data in the RAM 123. In the following description, the RIP 128 uses a dedicated chip independent from the CPU 121. In another example, the RIP 128 may not be provided, and the CPU 121 may convert the bitmap data.

The internal storage 130 is a non-volatile storage region for storing data to be held even after the power is shut down among the information that the main board 110 uses. An example of the internal storage 130 is a flash ROM. Other examples of the internal storage 130 are a hard disk and a solid-state drive.

The RTC 134 is a hardware chip for managing time information in the image forming apparatus 102 in a non-volatile manner. When the RTC 134 is operated with a battery, the time information is regularly updated even after the power of the image forming apparatus 102 is shut down.

As illustrated in FIG. 1, the printer engine 150 includes the engine control unit 151, a main body door 194, a sheet feed stage 195, and a cartridge 196. The printer engine 150 further includes the ITB 197 and the fixing unit 198. The cartridge 196, the ITB 197, the fixing unit 198, and the recovered-toner container 199 are replaceable according to the degree of consumption on a per consumable basis. The durability of these consumables greatly changes depending on the use conditions (environmental factors, the type of the sheet printed by the user, and the details of the print). For that reason, the printer engine 150 can be continuously used by replacing only a worn-out consumable without replacing the whole.

As illustrated, the engine control unit 151 includes a CPU 161, a ROM 162, and a RAM 163. The engine control unit 151 further includes an engine I/F 152, a door control unit 164, a sheet-feed-stage control unit 165, a cartridge control unit 166, an ITB control unit 167, a fixing-unit control unit 168, and a recovered-toner-container control unit 169. These components are connected to one another with a bus 153.

The control units for the consumables function as interfaces for exchanging data and statuses with the consumables. Engine firmware (programs installed in the firmware of the printer engine 150) can acquire and control the states of the consumables via the control units. The consumable control units and the consumables are connected using wire communication, for example, general-purpose input/output (GPIO) or Inter-Integrated Circuit ($I^2C$). For the communication between the consumable control units and the consumables, close proximity wireless communication, such as a radio frequency identifier (RFID), may be used.

The CPU 161 expands the engine firmware stored in the ROM 162 in the RAM 163 to execute the engine firmware. Thus, the CPU 161 controls the printer engine 150.

The ROM 162 is a non-volatile memory that stores, for example, the engine firmware to be executed by the CPU 161.

The RAM 163 stores, for example, the engine firmware expanded from the ROM 162. The RAM 163 also stores temporary data necessary for other processing.

The main body door 194 is an access door that is provided on the image forming apparatus 102 to remove a sheet jam if generated during sheet conveyance. The door control unit 164 is a control unit that acquires the state of the main body door 194 using a sensor and notifies the engine firmware of the state.

The sheet feed stage 195 is a sheet holding unit for holding the sheets to be used in image formation. Examples include a standard cassette and a manual feed tray provided at the image forming apparatus 102. The sheet feed stage 195 may be added as a casing separated from the main body. Examples include an optional cassette provided under the image forming apparatus 102 and an optional deck provided on the side. The configuration of the sheet feed stage is not restricted in embodying the present disclosure.

The sheet feed stage 195 determines whether sheets are present or the state of the door provided at the sheet feed stage 195 and reports the information to the engine firmware via the sheet-feed-stage control unit 165. The sheet feed stage 195 feeds sheets for image formation according to an instruction from the engine firmware via the sheet-feed-stage control unit 165.

The sheet-feed-stage control unit 165 is a control unit for controlling and managing the sheet feed stage 195.

The cartridge 196 is a unit containing toner for use in image formation and suppling the toner onto a drum according to an instruction from the engine firmware via the cartridge control unit 166. In the present embodiment, the developing unit and the drum unit also have the cartridge 196.

A set of plural integral-type toner cartridges is expressed as the cartridge 196 for ease of explanation. The present disclosure can also be applied to a configuration in which a set of a toner cartridge that contains toner and a drum cartridge that holds a drum is the toner cartridge 196. In this case, the developer unit may be disposed in either of the toner cartridge and the drum cartridge.

In the case where the cartridge 196 includes a non-volatile memory (not illustrated), the engine firmware may read and write information from and to the non-volatile memory via the cartridge control unit 166. For example, the degree of consumption of each cartridge 196 may be stored in the non-volatile memory for management.

The cartridge control unit 166 is a control unit for managing and controlling the cartridge 196.

The ITB 197 is s transfer belt for use in forming a color image with toners of plural colors by transferring the toners to the ITB 197 according to an instruction from the engine firmware via the ITB control unit 167.

Figure 9:
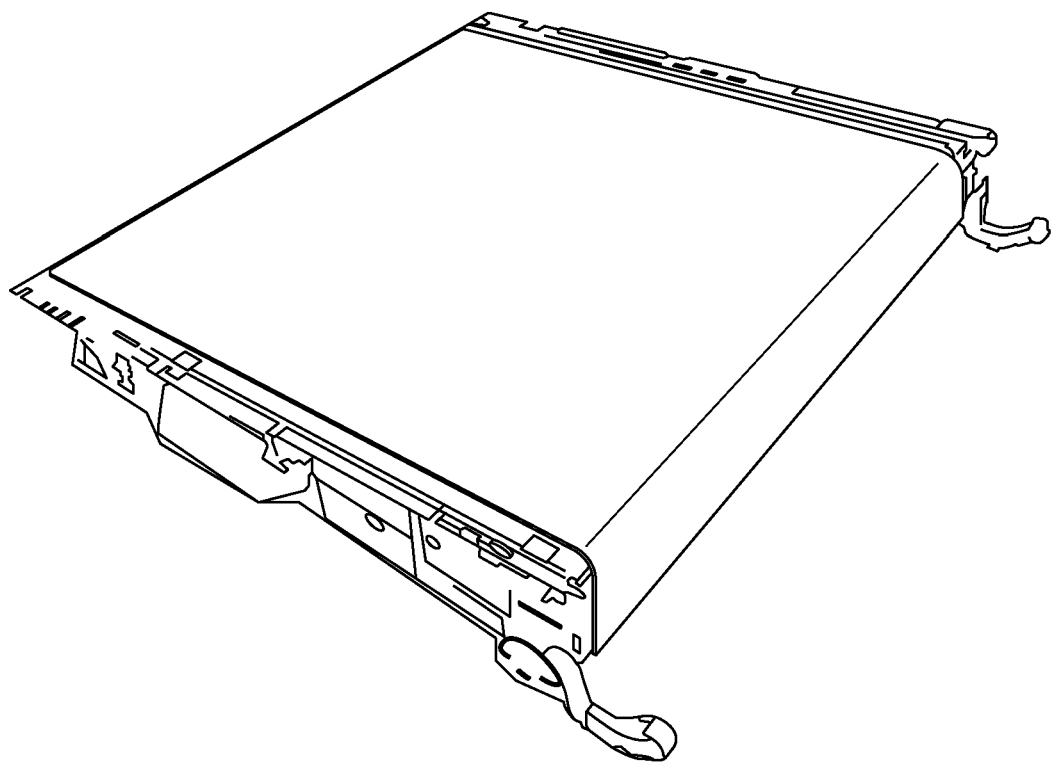
FIG. 9 is a schematic diagram of the ITB.

FIG. 9 is a schematic diagram of the ITB 197.

The entire surface of the ITB 197 is covered with a transfer belt. For that reason, in order to install a non-volatile memory to the ITB 197, physical and electrical constraints and additional costs need to be considered not only for the ITB 197 but also for the image forming apparatus 102.

In order to suppress the cost of separately producing the ITB 197 for charging and non-charging as much as possible, the present embodiment employs a form in which the operation type is expressed according to whether any of the electrical-signal output ports of the ITB 197 includes an inverting circuit. For example, a charge operation type ITB 197 includes one inverting circuit at a predetermined output port. A non-charge operation type ITB 197 includes no inverting circuit or an even number of inverting circuits. This allows the engine firmware to determine whether the operation type of the ITB 197 is the charge operation type or the non-charge operation type by observing the output signal. In other words, the image forming apparatus 102 can determine the operation type based on the voltage level of the predetermined output port of the ITB 197. Here, an example using a method using an inverting circuit is described. However, the present disclosure may be applied to a configuration using another determination unit.

The ITB control unit 167 is a control unit for controlling and managing the ITB 197.

The fixing unit 198 is a unit for fixing the toner transferred to the ITB 197 onto a sheet with high temperature and high pressure. In the present embodiment, the fixing unit 198 includes a non-volatile memory 188. The engine firmware can read and write the information in the non-volatile memory 188 via the fixing-unit control unit 168.

Table 1 is an example of the contents stored in the non-volatile memory 188 of the fixing unit 198. The non-volatile memory 188 stores the serial number, the model number, the operation type, the print count, and the check sum. The serial number is a number given during production to identify the individual fixing unit 198. The model number is a number recorded at the production to determine the type of the fixing unit 198. The operation type is operation type information recorded during production to identify the operation type of the fixing unit 198. The print count is information on the number of sheets printed using the fixing unit 198 during and after completion of printing. The check sum is check sum information for computing and recording the information every time the information is updated.

TABLE 1

| Address | Data length (byte) | Type | Content |
|---|---|---|---|
| 0x00 | 8 | RO | Serial Number |
| 0x08 | 4 | RO | Model Number |
| 0x0C | 4 | RO | Operation type<br>0000h = Charged operation type<br>0001h = Non-charge operation type |
| 0x10 | 8 | RW | Number of prints |
| 0x18 | 32 | RW | Check sum |

The fixing-unit control unit 168 is a control unit for controlling and managing the fixing unit 198.

The recovered-toner container 199 is a container for recovering excessive toner generated during image formation.

The recovered-toner-container control unit 169 is a control unit for controlling and managing the recovered-toner container 199. The recovered-toner-container control unit 169 observes the amount of recovered toner stored in the recovered-toner container 199 and reports the amount to the engine firmware.

Figure 2B:
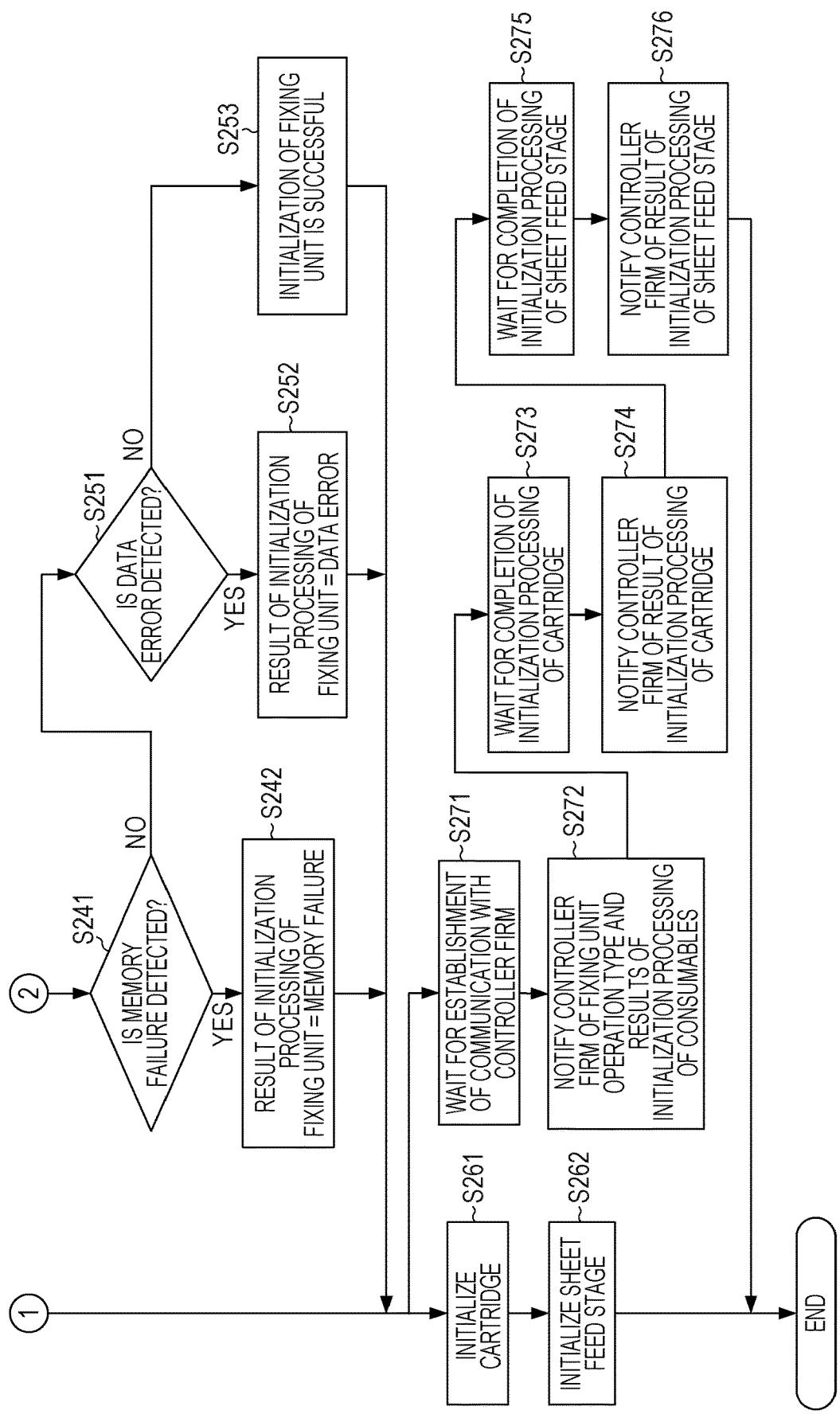

FIGS. 2A and 2B illustrate a flowchart of a process for initializing consumables executed by the engine control unit 151, which is the subsystem.

This process is implemented by the CPU 161 reading and executing the engine firmware expanded in the RAM 163.

A series of processes performed by the engine firmware to operate the individual consumables via the control units for the consumables will be simply described. Here, the description will be given taking as an example a process of initializing the fixing unit 198 with the engine firm.

(1) The engine firmware sends an input signal for initializing the fixing unit 198 via the fixing-unit control unit 168. (2) The fixing unit 198 executes initialization processing based on the input signal and sends an output signal to the engine firmware. (3) The engine firmware observes the output signal to determine whether the initialization has succeeded. The following description is given in a simplified manner, like "engine firmware performs initialization processing of the fixing unit 198 and obtains the result of the initialization processing".

This processing is performed as part of initialization processing for making the installed part available when the power to the image forming apparatus 102 is turned on, when the image forming apparatus 102 returns from a power saving mode, or when the door is closed.

First, the initialization processing performed by the engine firmware will be described.

The engine firmware performs initialization processing of the main body door 194 (S201).

Next, the engine firmware performs initialization processing of the recovered-toner container 199 (S202). The engine firmware performs initialization processing of the fixing unit 198 and obtains the result of the initialization processing of the fixing unit 198 including the placement state (S203).

The engine firmware switches processes according to the placement state of the fixing unit 198 (S204).

If the engine firmware detects that the fixing unit 198 is uninstalled, then the engine firmware determines that the initialization processing of the ITB 197 is successful (S210).

The engine firmware determines that the operation type of the fixing unit 198 is unknown (S211) and the result of fixing unit initialization processing is "uninstalled" (S212).

The purpose of determining that the result of the initialization processing of the ITB 197 is successful is to prevent unnecessary messages from being displayed, because the operation mode of the fixing unit 198 is unknown.

If it is detected that the fixing unit 198 has been installed, then the engine firmware reads the operation type of the fixing unit 198 from the non-volatile memory 188 in the fixing unit 198 (S221).

The engine firmware switches processes depending on the operation type of the fixing unit 198 (S222).

When the operation type of the fixing unit 198 is a charge operation type or a non-charge operation type, the engine firmware performs initialization processing of the ITB 197 based on the operation type of the fixing unit 198 and obtains the result of the initialization processing (S223).

If the operation type of the fixing unit 198 is neither the charge operation type nor the non-charge operation type, that is, unknown, then the engine firmware determines that the initialization processing of the ITB 197 has failed (S231).

The engine firmware switches processes depending on whether a failure of the non-volatile memory 188 of the fixing unit 198 has been detected at the initialization processing of the main body door 194 (S201) or the process of reading the operation type of the fixing unit 198 (S221) (S241).

If a memory failure is detected, then the engine firmware determines that the result of the initialization processing of the fixing unit 198 is a memory failure (S242). For example, when the non-volatile memory 188 of the fixing unit 198 is electrically or physically damaged, the engine firmware determines that a memory failure has occurred.

The engine firmware switches processes depending on whether a data error of the non-volatile memory 188 of the fixing unit 198 is detected at the initialization processing of the fixing unit 198 (S203) or the process of reading the operation type of the fixing unit 198 (S221) (S251).

If a data error is detected, the engine firmware determines that the result of the initialization processing of the fixing unit 198 is a data error (S252). For example, when the content of the non-volatile memory 188 of the fixing unit 198 can be read, but the content is an unexpected value, or the check sums of the data do not match, so that the data is damaged, the engine firmware determines that a data error has occurred.

If neither a memory failure nor a data error is detected, the engine firmware determines that the initialization processing of the fixing unit 198 is successful (S253).

Subsequent processes S261, S262, and S271 to S276 can be executed in parallel. The engine firmware executes initialization processing of the cartridge 196 (S261). The engine firmware executes initialization processing of the sheet feed stage 195 (S262).

The engine firmware waits for establishment of communication with the controller firmware (S271). When the communication is established, the engine firmware notifies the controller firmware of the operation type of the fixing unit 198 and the result of the initialization processing of the consumables (S272). For example, the engine firmware may notify the controller firmware of the door opening/closing state, the sensor value, or the error of the sensor, as the result of the initialization processing of the main body door 194 or the result of the initialization processing of the recovered-toner container 199.

Thereafter, the engine firmware waits for completion of the initialization processing of the cartridge 196 (S273) and notifies the controller firmware of the result of the initialization processing of the cartridge (S274).

The engine firmware waits for completion of the initialization processing of the sheet feed stage 195 (S275) and notifies the controller firmware of the result of the initialization processing of the sheet feed stage 195 (S276).

According to the procedure illustrated in the present embodiment, the engine firmware can start the initialization processing of the consumables without waiting for the notification on the operation type of the main body of the image forming apparatus 102 from the controller firmware to the engine firmware. This reduces the time from turning on the power until printing becomes possible as compared with a configuration in which the main-body operation type is reported to the engine firmware.

In the present embodiment, when the operation type of the fixing unit 198 cannot be read, the initialization processing of the ITB 197 is determined to have failed, and the initialization of the ITB 197 is not performed (S231). In addition to this method, several variations are conceivable.

For example, when the operation type of the fixing unit 198 is unknown, initialization processing of the ITB 197 may be performed after any operation type is determines to be a temporary operation type. When the temporary operation type of the fixing unit 198 and the operation type of the image forming apparatus 102 main body match and initialization processing of the ITB 197 is successful, it can be determines that the ITB 197 is available. In contrast, when the temporary operation type of the fixing unit 198 and the operation type of the image forming apparatus 102 main body do not match, it can be determined that the ITB 197 is unavailable even if the result of the initialization processing of the ITB 197 is successful.

Figure 3:
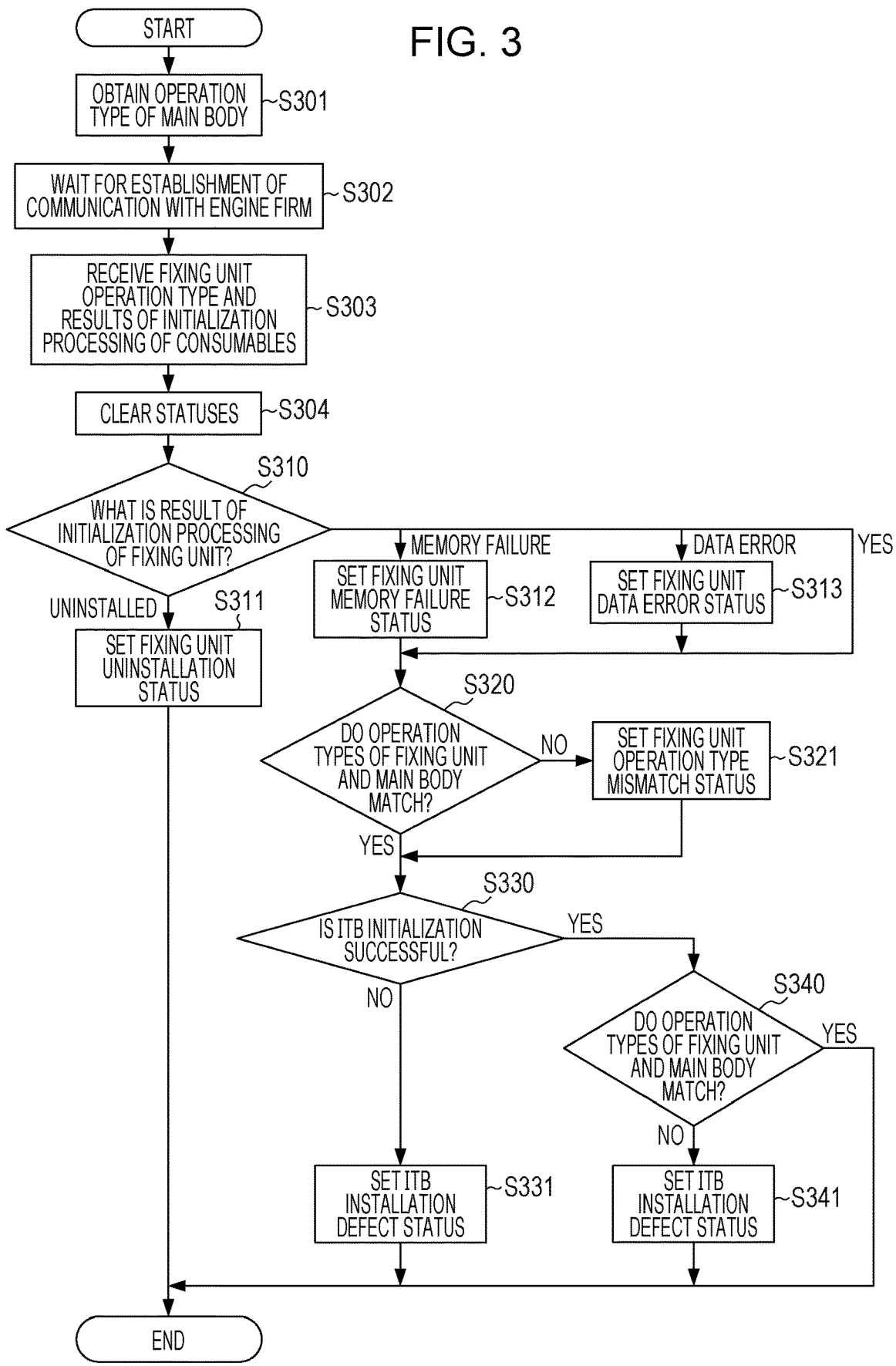
FIG. 3 is a flowchart of a process for initializing consumables executed by a main board.

FIG. 3 is a flowchart of a process for initializing consumables executed by the main board 110, which is a main system. This process is implemented by the CPU 121 reading controller firmware expanded in the RAM 123 and executing the controller firmware. This processing is processing for storing various states of the various consumables occurring in the image forming apparatus 102 as statuses for applications in and out of the image forming apparatus 102 main body.

Here, the flowchart will be described focusing on some consumables for ease of explanation. In some embodiments of the present disclosure, consumables, the main body, and jobs other than those described here can be managed and displayed as statuses.

The controller firmware acquires the operation type of the image forming apparatus 102 main body from the ROM 122 (S301).

The controller firmware waits for establishment of communication with the engine firmware (S302).

The controller firmware receives the operation type of the fixing unit 198 and the results of initialization processing of the consumables from the engine firmware (S303).

The controller firmware clears the statuses (S304).

The controller firmware switches processes according to the result of the initialization processing of the fixing unit 198 reported from the engine firmware (S310). If the result of the initialization of the fixing unit 198 is "uninstalled", the controller firmware sets an uninstallation status of the fixing unit 198 (S311).

If the result of the initialization processing of the fixing unit 198 is "memory failure", the controller firmware sets a memory failure status of the fixing unit 198 (S312). If the result of the initialization processing of the fixing unit 198 is "data error", the controller firmware sets a data error states of the fixing unit 198 (S313).

If the result of the initialization processing of the fixing unit 198 is successful, the controller firmware executes the processes from S320 onward without setting the statuses.

The controller firmware switches processes depending on whether the operation type of the fixing unit 198 and the operation type of the image forming apparatus 102 main body match (S320). If the operation type of the fixing unit 198 and the operation type of the image forming apparatus 102 main body do not match, the controller firmware sets an operation type mismatch status of the fixing unit 198 (S321). If the operation type of the fixing unit 198 and the operation type of the image forming apparatus 102 main body match, the subsequent process is executed.

The controller firmware switches processes depending on whether the result of initialization processing of the ITB 197 is successful (S330). If the initialization processing of the ITB 197 results in failure, the controller firmware sets an installation-failure status of the ITB 197 (S331). If the result of the initialization processing of the ITB 197 is successful, then the controller firmware determines whether the operation type of the fixing unit 198 and the operation type of the image forming apparatus 102 match (S340). If the operation type of the fixing unit 198 and the operation type of the image forming apparatus 102 do not match, the controller firmware sets an installation-failure status of the ITB 197 (S341).

Only if the operation type of the fixing unit 198 and the operation type of the ITB 197 match, the controller firmware determines at S330 that the result of the initialization processing of the ITB 197 is successful. However, there may be a case in which the operation types of the fixing unit 198 and the image forming apparatus 102 do not match. Based on this, the determination at S330 is corrected at S340 and S341.

When the power to the image forming apparatus 102 is turned on, the sequence executed by the engine control unit 151 illustrated in the flowchart in FIGS. 2A and 2B and the sequence executed by the main board 110 illustrated in the flowchart in FIG. 3 are started at the same time.

At that time, the engine control unit 151, which is the subsystem, reads the operation type of the fixing unit 198, which is a consumable, from the non-volatile memory 188 (S221). At the point in time when communication with the main board 110, which is the main system, is established, the engine control unit 151 notifies the main board 110 of the operation type of the fixing unit 198 (S272, S303).

Thus, the main board can acquire the operation type of the fixing unit 198 at an early time without the need for waiting for completion of the initialization of the other consumables.

Figure 4:
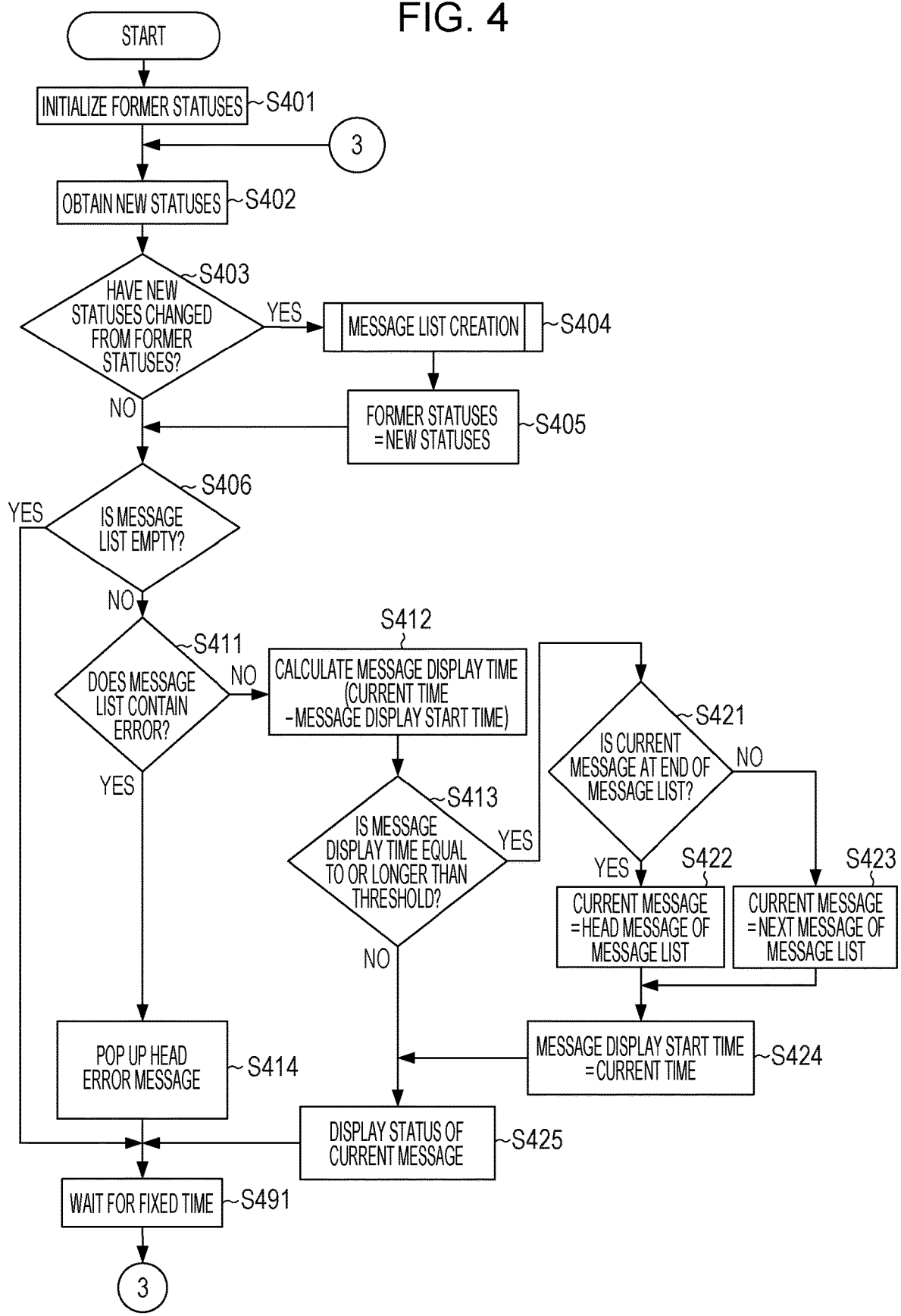
FIG. 4 is a flowchart illustrating a process for displaying the statuses of the image forming apparatus.
Figure 5:
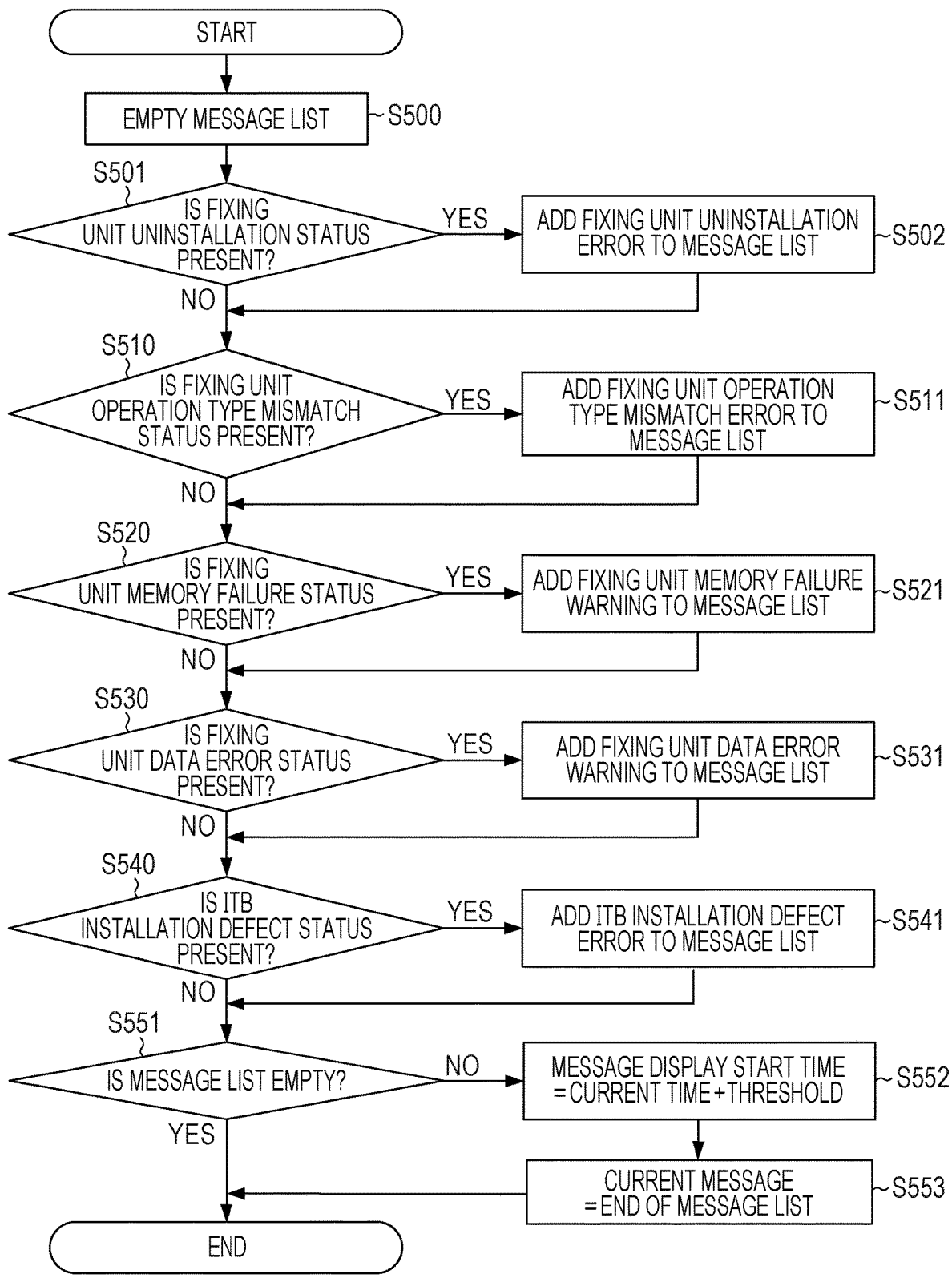
FIG. 5 is a flowchart for creating a message list based on the statuses of the image forming apparatus.

FIGS. 4 and 5 are flowcharts for displaying a message list from the statuses of the consumables in the present embodiment.

Prior to the descriptions of the flowcharts, the concept of "message list" will be described.

Table 2 is an example of a message list including several messages including severity and displayed words. Table 2 illustrates a case in which the main body operation type is "non-charge operation type", the fixing unit is in "memory failure" and of "charge operation type", and the ITB is of "non-charge operation type".

In the present embodiment, the severity of the messages is separated into "error message" and "warning message". Words to be displayed are prepared for each message.

In the case of the above-described conditions, three kinds of message are prepared.

In No. 1 of the message list, a message "an unavailable fixing unit is connected" is stored because the operation type of the image forming apparatus main body and the operation type of the fixing unit do not match.

In No. 2 of the message list, a message "a part of the fixing unit is broken" is stored because the memory failure of the fixing unit is detected.

In No. 3 of the message list, a message "check the connection of the ITB" is stored because the operation type of the fixing unit and the operation type of the ITB do not match.

TABLE 2

| No. | Severity | Displayed words |
| --- | --- | --- |
| 1 | Error | Unavailable fixing unit is connected |
| 2 | Warning | Part of the fixing unit is broken |
| 3 | Error | Check the connection of the ITB |

In some embodiments of the present disclosure, managing the error messages includes subdividing the severity of the error messages. In some embodiments, the warning message is subdivided into messages displayed on the screen all the time and messages displayed only when an instruction from the UI panel 111 is given. Furthermore, the messages may provide image information, such as icons, or additional information, such as color. These can be implemented after taking various ideas according to the needs of the user.

Referring back to FIG. 4, the controller firmware initializes the former statuses (S401).

The controller firmware obtains the statuses set in the flowchart in FIG. 3 as new statuses (S402).

The controller firmware switches processes depending on whether there is a change between the former statuses and the new statuses (S403). If there is a change between the former and new statuses, the controller firmware creates a message list using the process described later (S404). The details of the creation of the message list will be described with reference to the flowchart in FIG. 5.

The controller firmware updates the former status code to a new status code (S405).

Next, the controller firmware switches processes depending to whether the message list is empty (S406). If the message list is empty, the controller firmware waits for a fixed time (S491) and starts the process from acquisition of new statuses (S402).

If the message list is not empty, the controller firmware switches processes depending on whether the message list includes an error (S411). If the message list includes an error, the controller firmware displays, in a pop-up window, an error message at the head of the error messages in the message list (S414).

If the message list includes no error message, that is, all the messages in the message list are warning messages, the controller firmware calculates the time since a message was displayed last time (S412). The controller firmware switches processes depending on whether the message display time is equal to or longer than a threshold of message display time (S413). An example of the threshold of the message display time is 500 ms. If the message display time does not exceed the threshold, the controller firmware displays the status of the message to be displayed at present (S425), waits for a fixed time (S491), and starts the process from acquisition of new statuses again (S402).

If the message display time exceeds the threshold, the controller firmware switches processes depending on whether the currently displayed message is at the end of the message list (S421). If the currently displayed message is at the end of the message list, the controller firmware determines the message at the head of the message list as a message to be displayed (S422). If the message is not at the end of the message list, the controller firmware determines a message next to the currently displayed message as a message to be displayed (S423). Thus, the messages are switched one after another at regular time intervals.

The controller firmware sets the message display start time to the current time (S424). The controller firmware displays the status of a message to be displayed at present based on the status (S425), waits for a fixed time (S491), and again starts the process from acquisition of new statuses (S402).

Thus, the controller firmware displays the messages included in the message list according to various message types.

FIG. 5 is a flowchart for the controller firmware to create a message list based on the statuses that express the state of the image forming apparatus 102, which illustrates the details of the process at S404 in FIG. 4.

First, the controller firmware empties the message list (S500).

The controller firmware determines whether an uninstallation status of the fixing unit 198 is present (S501). If the determination is Yes, the controller firmware adds an uninstallation error of the fixing unit 198 to the message list (S502).

Next, the controller firmware determines whether an operation type mismatch status of the fixing unit 198 is present (S510). If the determination is Yes, the controller firmware adds an operation type mismatch error of the fixing unit 198 to the message list (S511).

Next, the controller firmware determines whether a memory failure status of the fixing unit 198 is present (S520). If the determination is Yes, the controller firmware adds a memory failure warning of the fixing unit 198 to the message list (S521).

Next, the controller firmware determines whether a data error status of the fixing unit 198 is present (S530). If the determination is Yes, the controller firmware adds a data error warning of the fixing unit 198 to the message list (S531).

Next, the controller firmware determines whether an installation defect status of the ITB 197 is present (S540). If the determination is Yes, the controller firmware adds an installation defect error of the message list to the ITB 197 (S541).

The controller firmware switches processes depending on whether the message list is empty (S551). If the message list is not empty, the controller firmware sets the message display start time to a time obtained by adding a threshold to the current time so that the time is updated next time (S552). The controller firmware sets the current message as the end of the message list so that a message at the head of the message list is always selected next time (S553).

FIGS. 6A and 6B illustrate a table illustrating how the controller firmware determines the physical statuses of the ITB 197 and the fixing unit 198 as the message list. FIGS. 6A and 6B illustrates the results on a non-charge operation main body as a precondition. The solid filled squares in the drawing indicate that the physical statuses are displayed as error messages. Blank squares in the drawing indicate that the physical statuses are displayed as warning messages.

(a) Connection state of Fixing unit is the connection state of the fixing unit 188. Specifically, Connection state is any of Normal, Memory failure, and Uninstalled.

(b) Operation type of Fixing unit is the descriptions of operation types stored in the non-volatile memory 188 of the fixing unit 198. Specifically, Operation type includes Non-charge operation type and Charge operation type. When the fixing unit has a memory failure or a data error, or when the fixing unit is not uninstalled, the operation type of the fixing unit is Unknown.

(c) Connection state of ITB is the connection state of the ITB 197. Specifically, Connection state includes Non-charge, Charge, Uninstalled, and Failure. However, since both Uninstalled and Failure cause the initialization processing to fail, Uninstalled and Failure are discussed as one.

The engine firmware notifies the controller firmware of information (d) to (f) about the consumables based on the states (a) to (c).

(d) Result of initialization processing of Fixing unit is the result of initialization processing of the fixing unit 198 performed by the engine firmware. Specifically, Result includes Success, Memory failure, Data error, and Uninstalled.

(e) Operation type of Fixing unit is an operation type that the engine firmware obtains from the non-volatile memory 188 of the fixing unit 198. Specifically, Operation type includes Non-charge operation type, Charge operation type, and Unknown.

(f) Result of initialization processing of ITB is the result of initialization processing of the ITB 197 performed by the engine firmware. Specifically, Result includes Success and Failure.

The controller firmware receives the information (d) to (f) on the consumables to determine a message list to be displayed for the user.

(g) Uninstallation error message of Fixing unit is a message displayed when (a) Connection state of Fixing unit is Uninstalled (Nos. 25 to 27).

(h) Operation type mismatch error message of Fixing unit is a message displayed when (b) Operation type of Fixing unit does not match the main body operation type (Nos. 4 to 6, Nos. 10 to 15, Nos. 19 to 24). Since the image forming apparatus 102 main body in the present embodiment is of a non-charge type, as described above, this error message is displayed when the operation type of the fixing unit is a charge type.

(i) Memory failure warning message of Fixing unit is a message displayed when (a) Connection state of Fixing unit is a memory failure (Nos. 7 to 15).

(j) Data error warning message of Fixing unit is a message displayed when (a) Connection state of Fixing unit is a data error (Nos. 16 to 24).

(k) Installation defect error of ITB is a message displayed when (f) Initialization processing of ITB results in failure (Nos. 2 to 4, No. 6, Nos. 8 to 10, Nos. 12 to 15, Nos. 17 to 19, Nos. 21 to 24). (k) Installation defect error of ITB is also displayed when (f) Initialization processing of ITB is successful, but (e) Operation type of Fixing unit, which is used in the determination, does not match the operation type of the main body (Nos. 5, 11, and 20).

The message list may include a plurality of messages, as described above. For example, in the state of No. 4, both messages of (h) Operation type mismatch error of Fixing unit and (k) Installation defect error of ITB are displayed. In the present embodiment, one of the error messages is displayed in a pop-up window in consideration of the physical limitation on the number of letters that can be displayed on the UI panel 111.

The warning messages are displayed in toggle format in a time division manner including warning messages regarding the other consumables not discussed here, the main body, and a print job. For example, when preparation for replacing the cartridge 196 is needed in a state in which a memory failure occurs in the fixing unit (No. 7), a warning message indicating the fixing unit memory failure and a warning message to replace the cartridge are alternately displayed.

FIGS. 7A to 7D illustrate examples in which the controller firmware displays an error message or a warning message. The process for displaying these messages is executed by the controller firmware, and the messages are displayed on the UI panel 111.

Figure 7A:
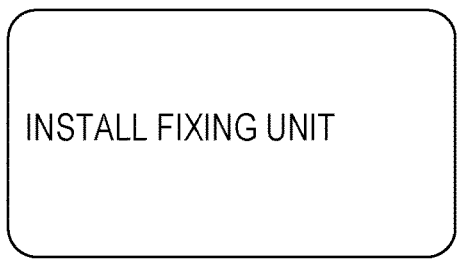
FIGS. 7A to 7D are diagrams illustrating examples in which the controller firmware displays an error message or a warning message.

FIG. 7A illustrates an example in which the controller firmware displays an uninstallation error message of the fixing unit 198 on the UI panel 111. The error message is displayed on, for example, information on the remaining amount of the cartridge 196, in the form of overwriting a pop-up including the message information.

Figure 7B:

FIG. 7B illustrates an example in which the controller firmware displays an operation type mismatch error message of the fixing unit 198 on the UI panel 111.

Figure 7C:

FIG. 7C is illustrates an example in which the controller firmware displays an installation defect error message of the ITB 197 on the UI panel 111. The message list may include both of the operation type mismatch error message of the fixing unit 198 and the installation defect error message of the ITB 197 (for example, No. 4 in FIG. 6A). In this case, one of the error messages is displayed in a pop-up window. Since, in the present embodiment, match or mismatch of the operation type of the ITB 197 is indirectly determined based on the operation type of the fixing unit 198, the fixing unit 198 is given priority if the same error message is displayed.

Figure 7D:
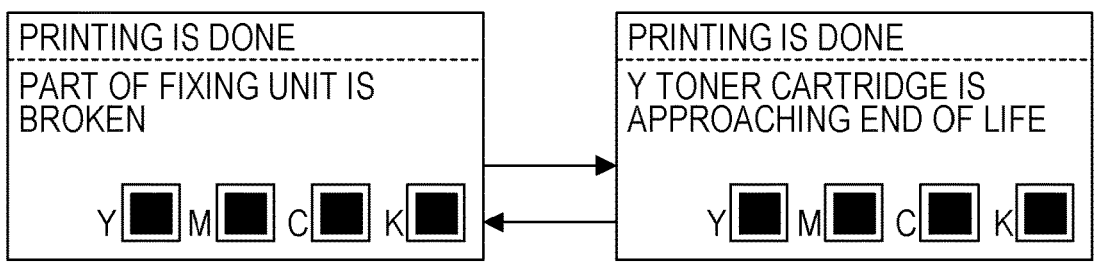

FIG. 7D illustrates an example in which the controller firmware displays at the same time a warning message indicating that the fixing unit 198 has a memory failure and a warning message indicating that a yellow cartridge in the cartridge 196 is approaching the end of life. The warning messages are used to draw user's attention, but the failure or the like does not always make the image forming apparatus 102 unavailable. For that reason, the warning messages are displayed together with, for example, remaining amount information on the cartridge 196. If a plurality of warning messages are to be displayed, the warning messages are displayed one after another.

FIGS. 7A to 7D illustrate mere examples of a screen display of the present disclosure. For example, a plurality of display screens may be allocated to one error message and may be displayed one after another like warning messages. In some embodiments, error messages related to consumables of the same type may be displayed one after another like warning messages.

The messages included in the message list may be assigned detailed priorities, and the message to be displayed may be determined according to the priority. Each message may be given a skippable flag, so that the pop-up windows of some messages may be closed by a cancelling operation.

For example, for the uninstallation error of the fixing unit 198 as in (A), the skippable flag is set to OFF, so that the subsequent job is not executed until the fixing unit 198 is replaced. For the operation type mismatch error of the fixing unit 198 as in (B), the skippable flag is set to ON, so that the fixing unit 198 can be used continuously by an operation on the UI panel 111.

Image forming apparatuses having a function other than printing, such as multifunctional machines, may be configured to provide the available function to the users whenever possible even if part of the consumables has a problem. For example, even if the fixing unit 198 is uninstalled, an image forming apparatus including a scanner (not illustrated) may have the function of reading a document and transmitting the scanned image data as a mail to the user via a mail server. In some embodiments, an image forming apparatus having a facsimile line (not illustrated) stores facsimile data transmitted through the facsimile line in the internal storage 130 of the image forming apparatus 102.

Although the present embodiment is an example in which mismatch of the operation type is displayed on the UI panel 111, this is provided for illustrative purpose only, and is not intended to limit the present disclosure. The mismatch of the operation type may be reported to an external maintenance server via a network.

The present embodiment is an example in which the operation type of the image forming apparatus 102 main body is managed by the main board 110. In contrast, the operation type of the image forming apparatus 102 main body may be managed by the engine control unit 151. In this case, the engine firmware transmits the operation type of the main body to the controller firmware after the communication between the main board 110 and the engine control unit 151 is established. The controller firmware receives the operation type of the main body from the engine firmware. Thus, the present disclosure may take various forms in implementation.

Second Embodiment

A second embodiment is an example in which the operation types of consumables installed at factory shipment are used.

At factory shipment, consumables are installed according to the operation type of the image forming apparatus 102 main body. For that reason, storing the operation types of the consumables installed during the production process in the image forming apparatus 102 main body allows the initialization processing of the consumables to be executed without depending on the operation types of the other consumables.

Figure 8:
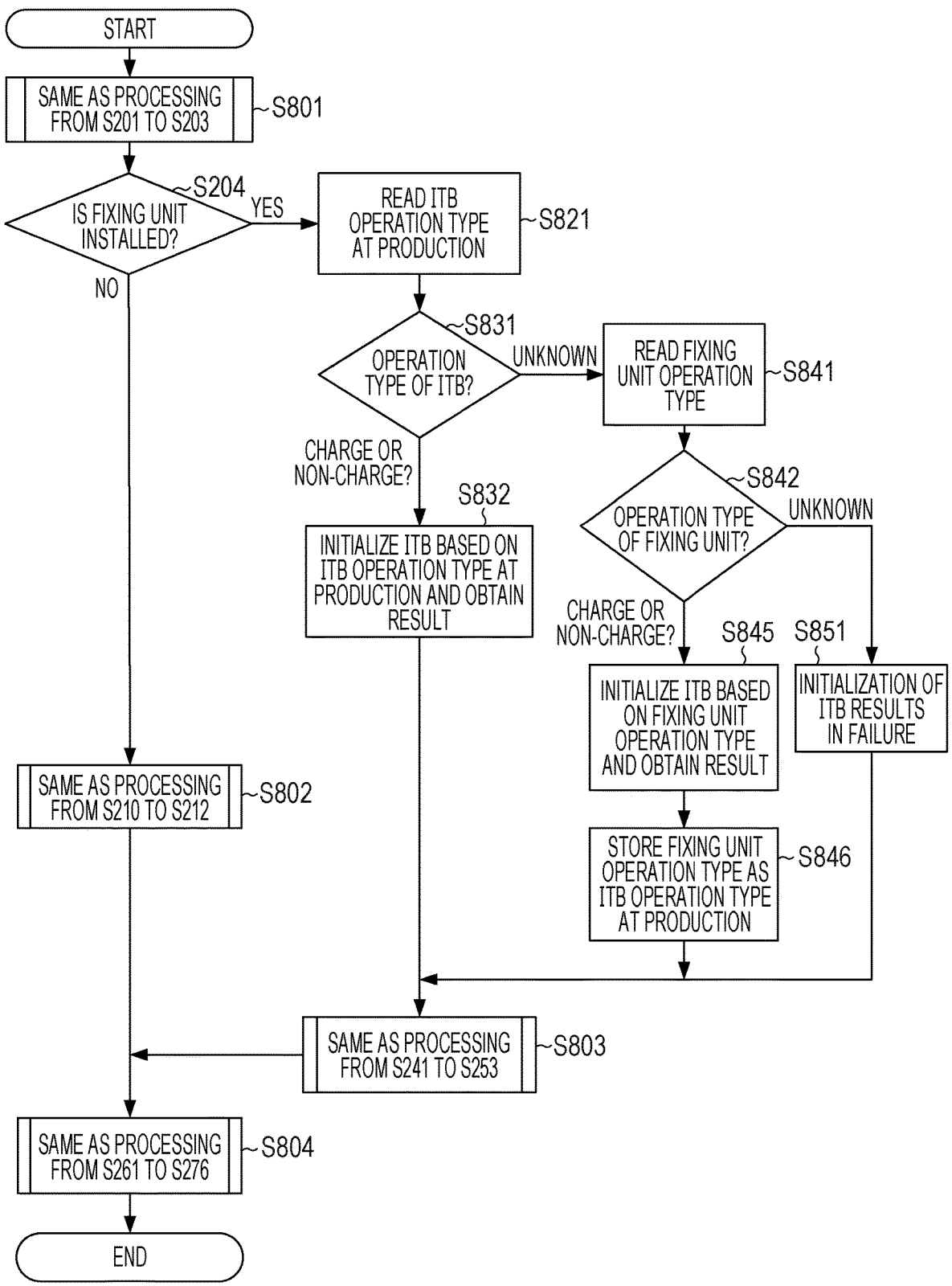
FIG. 8 is a flowchart of a process for initializing consumables executed by the engine control unit according to a second embodiment of the present disclosure.

FIG. 8 is a flowchart for a consumable initialization processing executed by the engine control unit 151.

Since the second embodiment is substantially similar to the first embodiment, a description will be given focusing on S821 to S851, which are executed instead of S221 to S253.

The engine firmware first performs the same processing from S201 to S203 of the first embodiment (S801).

The engine firmware switches processes depending on the installation state of the fixing unit 198 (S204).

If the fixing unit 198 is uninstalled, the engine firmware performs the same processing as S210 to S212 (S802).

If the fixing unit 198 is installed, the engine firmware reads the operation type of the ITB 197 installed during production from the ROM 162 (S821).

The engine firmware switches processes depending on the operation type of the ITB 197 installed during production (S831).

Since the operation type of the ITB 197 installed during production has not yet been stored in the ROM 162 at initial startup, the operation type is determined to be unknown. If the operation type of the ITB 197 installed during production is unknown, the engine firmware reads the operation type of the fixing unit 198 from the non-volatile memory 188 in the fixing unit 198 (S841).

The engine firmware switches processes depending on the operation type of the fixing unit 198 (S842). If the operation type of the fixing unit 198 is a charge operation type or a non-charge operation type, the engine firmware performs initialization processing of the ITB 197 based on the operation type of the fixing unit 198 and acquires the result of the initialization processing of the ITB 197 (S845). The engine firmware stores the operation type of the fixing unit 198 read from the fixing unit 198 in the ROM 162 as the operation type of the ITB 197 at production (S846).

If the operation type of the fixing unit 198 is neither the charge operation type nor the non-charge operation type, it is determined that the initialization processing of the ITB 197 has resulted in failure (S851). Thereafter, the engine control unit 151 performs the same processing as S241 to S253 of the first embodiment (S803).

For the second or later start-up, the operation type of the ITB 197 at production has already been stored in the ROM 162 as the charge operation type or the non-charge operation type. If it is determined whether the operation type of the ITB 197 at production is the charge operation type or the non-charge operation type, the engine firmware performs initialization processing of the ITB 197 based on the operation type of the ITB 197. The engine firmware obtains the result of the initialization processing of the ITB 197 (S832).

Thereafter, the engine firmware performs the same processing as S241 to S253 in the first embodiment (S803). Then, the engine firmware performs the same processing as S261 to S276 in the first embodiment (S804).

Performing the processing according to this flowchart allows the initialization processing of the ITB 197 after shipment to be performed based on the operation type of the fixing unit 198 installed at factory production. This allows verification whether the operation type of the ITB 197 matches the operation type supposed at production without depending on the content in the non-volatile memory 188 of the fixing unit 198.

Another application of the present embodiment is a form in which the controller firmware notifies the engine firmware of the operation type of the image forming apparatus 102 main body, and the engine firmware stores the operation type of the image forming apparatus 102 main body as the operation type of the ITB 197 installed during production.

Finally, still another embodiment of the present disclosure will be described.

Although the above embodiments exemplify the specific behavior of the present disclosure for the fixing unit 198 and the ITB 197, actually applicable consumables are not limited to the above. For example, the present disclosure may be applied to the sheet feed stage 195 or the recovered-toner container 199. The present disclosure may be applied not only to the sheet feed stage option but also to a sheet output stage option. Thus, making some kind of sheet output stage option installable to multifunction printers (MFPs) but unavailable in single function printers (SFPs) provides functional differences according to the product price.

The present disclosure can also be applied to apparatuses other than the image forming apparatus 102 including the main board 110 and the engine control unit 151, so that the processing is divided. An example is an image forming apparatus that performs image formation on one controller board. In this case, since all pieces of information can be referred to on single firmware, it is not necessary to wait for establishment of the communication between the controller firmware and the engine firmware.

The present disclosure can also be implemented by a form in which the main board 110 and the engine control unit 151 are housed in separate casings, like an image forming system that accompanies an external controller, such as a server.

Although the above embodiments have been described using an image forming apparatus that forms an image on a sheet, such as paper, as an example of the output apparatus, this is not intended to limit the present disclosure. For example, the present disclosure may also be applied to various devices that use consumables. For example, the present disclosure may be applied to a direct to garment (DTG) printer that prints on textiles of clothes or the like (also referred to as "garment"). Another application example is a three-dimensional (3D) printer including a container that contains a consumable material, such as resin or metal, and forming a three-dimensional object from the consumable material. In this case, examples of the replaceable consumables of the 3D printer include a container that contains a forming material, such as resin or metal, a container that contains a support member for forming a base or the like, and a print head for forming. The concept of the output apparatus of the present disclosure includes an image forming apparatus for forming an image on a sheet and a 3D printer for printing a three-dimensional object with a consumable material, as described above.

Other Embodiments

Embodiment(s) of the present disclosure can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-241486, filed Dec. 18, 2017, which is hereby incorporated by reference herein in its entirety.

What is claimed is:

1. An image forming apparatus comprising:
    at least one storage that stores first information indicating a service type of the image forming apparatus;
    at least one processor; and
    an installation portion to which a removable item is installed,
    wherein the at least one processor is configured to:
    acquire, from the at least one storage, the first information indicating the service type;
    acquire, from the removable item, second information indicating a service type stored in a memory attached to the removable item; and
    issue a predetermined notification in a case where a mismatch between the service type of the image forming apparatus indicated by the acquired first information and the service type indicated by the acquired second information is detected.

2. The image forming apparatus according to claim 1, wherein the predetermined notification is a notification indicating a warning or an error.

3. The image forming apparatus according to claim 2, wherein the predetermined notification is displayed on a display of the image forming apparatus.

4. The image forming apparatus according to claim 3, wherein in a case where the mismatch between the service type of the image forming apparatus indicated by the acquired first information and the service type indicated by the acquired second information is detected and other mismatch between the service type of the image forming apparatus and a service type indicated by information acquired from a memory attached to other removable item is detected, a plurality of notifications including the predetermined notification is displayed on the display in turn at predetermined intervals.

5. The image forming apparatus according to claim 3, wherein the removable item is a fixing unit, and wherein the other removable item is a transfer belt unit.

6. The image forming apparatus according to claim 1, wherein the removable item is a fixing unit.

7. The image forming apparatus according to claim 1, wherein the removable item is a transfer belt unit.

8. The image forming apparatus according to claim 1, wherein one of a charge service type and a non-charge service type is stored in the storage as the service type of the image forming apparatus and the information indicating one of a charge service type and a non-charge service type is acquired from the removable item installed to the image forming apparatus.

9. The image forming apparatus according to claim 1, wherein the second information is acquired from the memory attached to the removable item while the image forming apparatus is initialized by executing firmware for the image forming apparatus and the service type of the image forming apparatus is specified by the at least one controller while the at least one controller is initialized by executing firmware for the at least one controller.

10. The image forming apparatus according to claim 1, wherein the at least one processor is configured to specify, based on the stored first information, that the service type of the image forming apparatus is a service type for charging based on a number of sheets output by the image forming apparatus.

11. The image forming apparatus according to claim 1, further comprising a counter configured to count a number of sheet output by the image forming apparatus, wherein the at least one processor is configured to specify, based on the stored first information, that the service type of the image forming apparatus is a service type for charging based on the counter or a service type for not charging based on the counter.

12. The image forming apparatus according to claim 1, wherein the at least one processor is configured to specify, based on the stored first information, that the service type of the image forming apparatus is a service type that a user purchases the removable item.

13. A method for controlling an image forming apparatus comprising at least one storage that stores information indicating a service type of the image forming apparatus, at least one processor and an installation portion to which a removable item is installed, the method comprising:
acquiring the first information stored in the at least one storage;
acquiring second information a service type stored in a memory attached to the removable item; and
issuing a predetermined notification in a case where a mismatch between the service type of the image forming apparatus indicated by the acquired first information and the service type indicated by the acquired second information is detected.

* * * * *